(12) United States Patent
Liu (10) Patent No.: US 12,282,627 B2
(45) Date of Patent: Apr. 22, 2025

(54) TOUCH DETECTION DEVICE AND METHOD, AND ELECTRONIC APPARATUS

(71) Applicant: Chipone Technology (Beijing) Co., Ltd., Beijing (CN)

(72) Inventor: Cheng Liu, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/676,712

(22) Filed: May 29, 2024

(65) Prior Publication Data

US 2024/0310953 A1 Sep. 19, 2024

Related U.S. Application Data

(63) Continuation of application No. PCT/CN2023/114757, filed on Aug. 24, 2023.

(30) Foreign Application Priority Data

Nov. 23, 2022 (CN) .......................... 202211477329.8

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| 10,429,998 | B2 * | 10/2019 | Ogirko ................ G06F 3/04166 |
| 11,221,703 | B2 * | 1/2022 | Routley ................ G06F 3/0416 |
| 2011/0242050 | A1 | 10/2011 | Byun et al. |
| 2016/0378252 | A1 * | 12/2016 | Jeong .................... G06F 3/0446 |
| | | | 345/174 |

FOREIGN PATENT DOCUMENTS

| CN | 106201060 | 12/2016 |
| CN | 112986694 | 6/2021 |
| CN | 115729374 | 3/2023 |

OTHER PUBLICATIONS

ISA, International Search Report issued in Application No. PCT/CN2023/114757 on Nov. 15, 2023, 2 pages.

* cited by examiner

*Primary Examiner* — Stephen T. Reed
(74) *Attorney, Agent, or Firm* — Henry Patent Law Firm PLLC (57) ABSTRACT

The present disclosure relates to a touch detection device and method, and an electronic apparatus. The touch detection device comprises: a charge amplification circuit connected to a sensing point of a touch panel and configured to receive an excitation signal and charges of the sensing point, amplify the charges of the sensing point, and output a capacitance change signal of the sensing point; and a capacitance compensation circuit connected to the sensing point of the touch panel and configured to inject compensation charges into the sensing point in a process during which a level of the excitation signal changes, wherein a polarity of the compensation charges is related to a direction of the level of the excitation signal changing. The embodiment of the present disclosure may compensate for or even eliminate the influence caused by the parasitic capacitance of the touch panel, improve the accuracy of touch detection, and save the circuit area.

12 Claims, 3 Drawing Sheets

TOUCH DETECTION DEVICE AND METHOD, AND ELECTRONIC APPARATUS

CROSS-REFERENCE TO RELATED APPLICATION

This application is a continuation of and claim priority under 35 U.S.C. § 120 to International Application. No. PCT/CN2023/114757, filed on Aug. 24, 2023, which claims priority to Chinese Patent Application No. 202211477329.8, filed on Nov. 23, 2022, and entitled "Touch Detection Device and Method, Chip, Display Apparatus, and Electronic Apparatus" All the above referenced priority documents are hereby incorporated by reference.

TECHNICAL FIELD

The present disclosure relates to the field of touch technology, in particular to a touch detection device and method, a chip, a display apparatus, and an electronic apparatus.

BACKGROUND

Touch screens have been widely used in a variety of electronic products, and their sensing methods include the electromagnetic method, the capacitive method, and the ultrasonic method, etc., among which the most common sensing method is the capacitive method. In order to save the occupied area of the circuit, at present, many control circuits of touch screens have integrated the display drive circuit and the capacitive touch sensing circuit into a TDDI (touch and display driver integration) chip.

However, the area of the TDDI chip becomes large due to the integration of the touch sensing circuit and the display drive circuit. In addition, when the touch sensing circuit employs the self-capacitance detection method, a compensation capacitor must be provided inside the touch sensing circuit to offset the parasitic capacitance of the touch screen, thus further increasing the area of the TDDI chip.

SUMMARY

In view of the foregoing, the present disclosure provides a touch detection device, comprising:
 a charge amplification circuit connected to a sensing point of a touch panel and configured to receive an excitation signal and charges of the sensing point, amplify the charges of the sensing point, and output a capacitance change signal of the sensing point; and
 a capacitance compensation circuit connected to the sensing point of the touch panel and configured to inject compensation charges into the sensing point in a process during which a level of an excitation signal changes, wherein a polarity of the compensation charges is related to a direction of the level of the excitation signal changing.

In one possible implementation, the polarity of the compensation charges is positive if the excitation signal changes from a low level to a high level, or negative if the excitation signal changes from a high level to a low level.

In one possible implementation, the capacitance compensation circuit is further configured to:
 when the excitation signal changes from a first level to a second level, initialize a voltage of the sensing point to the first level, and gradually inject positive charges into the sensing point, the second level being higher than the first level; or
 when the excitation signal changes from the second level to the first level, initialize the voltage of the sensing point to the second level, and gradually inject negative charges into the sensing point.

In one possible implementation, the capacitance compensation circuit comprises a zeroth switch, a first switch, a second switch, a third switch, a fourth switch, a fifth switch, a sixth switch, a compensation capacitor, and a first operational amplifier, wherein
 a first end of the zeroth switch, a first end of the second switch, and a first end of the fourth switch are all connected to a first end of the compensation capacitor, and a first end of the first switch, a first end of the third switch, and a first end of the fifth switch are all connected to a second end of the compensation capacitor;
 a second end of the first switch and a second end of the second switch are grounded, and a second end of the zeroth switch and a second end of the third switch are connected to a power supply voltage,
 a second end of the fifth switch is connected to the sensing point and a first end of the sixth switch, and
 a positive input terminal of the first operational amplifier is connected to a second end of the sixth switch, and a negative input terminal of the first operational amplifier, an output terminal of the first operational amplifier, and a second end of the fourth switch are connected with one another.

In one possible implementation, the charge amplification circuit comprises a seventh switch, an eighth switch, a ninth switch, a tenth switch, an integrating capacitor, and a second operational amplifier, wherein
 a first end of the tenth switch is connected to the sensing point, and a second end of the tenth switch is connected to a first end of the eighth switch, a first end of the ninth switch, and a negative input terminal of the second operational amplifier,
 a second end of the eighth switch is connected to a first end of the integrating capacitor, and a first end of the seventh switch is connected to a second end of the integrating capacitor,
 a positive input terminal of the second operational amplifier is configured to receive the excitation signal, and
 an output terminal of the second operational amplifier is connected to a second end of the seventh switch and a second end of the ninth switch for outputting the capacitance change signal.

In one possible implementation, in a first time period of a process during which the excitation signal changes from a first level to a second level, the tenth switch and the ninth switch are turned on; the voltage of the sensing point is initialized to the first level; the second switch, the third switch, and the sixth switch are turned on; and the zeroth switch, the first switch, the fourth switch, the fifth switch, the seventh switch, and the eighth switch are turned off, the second level being higher than the first level; and
 in a second time period of the process during which the excitation signal changes from the first level to the second level, the seventh switch and the eighth switch are turned on; the ninth switch is turned off; and the second switch, the third switch, the fourth switch, and the fifth switch are cyclically switched on and off based on a first switching mode and a second switching mode, wherein
 in the first switching mode, the second switch and the third switch are turned off, and the fourth switch and the fifth switch are turned on; and in the second switching mode, the second switch and the third switch are turned on, and the fourth switch and the fifth switch are turned off.

In one possible implementation, in a first time period of a process during which the excitation signal changes from a second level to a first level, the tenth switch and the ninth switch are turned on; the voltage of the sensing point is initialized to the second level; the zeroth switch, the first switch, and the sixth switch are turned on; and the second switch, the third switch, the fourth switch, the fifth switch, the seventh switch, and the eighth switch are turned off, the second level being higher than the first level; and in a second time period of the process during which the excitation signal changes from the second level to the first level, the seventh switch and the eighth switch are turned on; the ninth switch is turned off; and the zeroth switch, the first switch, the fourth switch, and the fifth switch are cyclically switched on and off based on a third switching mode and a fourth switching mode, wherein in the third switching mode, the zeroth switch and the first switch are turned off, and the fourth switch and the fifth switch are turned on; and in the fourth switching mode, the zeroth switch and the first switch are turned on, and the fourth switch and the fifth switch are turned off.

According to one aspect of the present disclosure, there is provided a touch detection method, comprising:

receiving an excitation signal and charges of a sensing point of a touch panel, amplifying the charges of the sensing point, and outputting a capacitance change signal of the sensing point; and injecting compensation charges into the sensing point in a process during which a level of the excitation signal changes, wherein a polarity of the compensation charges is related to a direction of the level of the excitation signal changing.

In one possible implementation, the method further comprises:

the polarity of the compensation charges being positive if the excitation signal changes from a low level to a high level, or negative if the excitation signal changes from a high level to a low level.

In one possible implementation, when the excitation signal changes from a first level to a second level, a voltage of the sensing point is initialized to the first level, and positive charges are gradually injected into the sensing point, the second level being higher than the first level; or when the excitation signal changes from the second level to the first level, the voltage of the sensing point is initialized to the second level, and negative charges are gradually injected into the sensing point.

According to one aspect of the present disclosure, there is provided a chip, comprising the above touch detection device.

According to one aspect of the present disclosure, there is provided a display apparatus, comprising a plurality of display units and the above chip.

In one possible implementation, the display unit comprises a display panel, wherein the display panel includes at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, and a small pitch display panel.

According to one aspect of the present disclosure, there is provided an electronic apparatus, comprising the above display apparatus.

According to another aspect of the present disclosure, there is provided a touch detection device, comprising: a processor; and a memory for storing processor executable instructions, wherein the processor is configured to implement the above method when executing the instructions stored in the memory.

According to another aspect of the present disclosure, there is provided a non-transitory computer readable storage medium having computer program instructions stored thereon, wherein the computer program instructions, when executed by a processor, implement the above method.

According to another aspect of the present disclosure, there is provided a computer program product, comprising: computer readable code, or a non-transitory computer readable storage medium carrying computer readable code, wherein the processor in the electronic apparatus carries out the above method when the computer readable code is run in the processor of the electronic apparatus.

According to the embodiment of the present disclosure, the charge amplification circuit receives the excitation signal and the charges of the sensing point, amplifies the charges of the sensing point, and outputs the capacitance change signal of the sensing point; and the capacitance compensation circuit injects the compensation charges into the sensing point in a process during which the level of the excitation signal changes, and the polarity of the compensation charges is set to be related to a direction of the of the excitation signal changing, so that the influence caused by the parasitic capacitance of the touch panel can be compensated for or even eliminated, the accuracy of touch detection is improved, and the circuit area is saved.

Other features and aspects of the present disclosure will become apparent from the following detailed description of exemplary embodiments with reference to the drawings.

BRIEF DESCRIPTION OF THE DRAWINGS

The drawings included in and forming part of the description, together with the description, illustrate exemplary embodiments, features, and aspects of the present disclosure and serve to explain the principles of the present disclosure.

DETAILED DESCRIPTION

Various exemplary embodiments, features, and aspects of the present disclosure will be explained in detail below with reference to the drawings. In the drawings, the same reference signs denote elements with the same or similar functions. Although various aspects of the embodiments are shown in the drawings, unless otherwise specified, the drawings are not necessarily drawn to scale.

In the description of the present disclosure, it is appreciated that the directions or positional relationships indicated by the terms "length", "width", "up", "down", "front", "rear", "left", "right", "vertical", "horizontal", "top", "bottom", "in", "out", and the like are based on the drawings, and these terms are only used for convenience and simplification of the description of the present disclosure, and are not intended to indicate or imply that the referred devices or elements must have a specific orientation or must be constructed and operated in a specific orientation, and therefore they shall not be interpreted as restricting the present disclosure.

The words "first" and "second" are only used for descriptive purposes, and cannot be interpreted as indicating or implying relative importance or implicitly indicating the number of the technical feature concerned. Therefore, if a feature is defined by "first" or "second", it may explicitly indicate or implicitly indicate that there is one or more of this feature. In the description of the present disclosure, "a plurality of" means two or more, unless otherwise specified.

In the present disclosure, unless otherwise specified and defined, terms such as "mount", "connect" and "fix" should be interpreted in a broad sense. For example, the connection can be a fixed connection, a detachable connection, or an integrated connection; the connection can be a mechanical connection or an electrical connection; the connection can be a direct connection or an indirect connection through a medium; and the connection can be an internal communication between two elements or an interaction between two elements. For those of ordinary skill in the art, the specific meanings of the above terms in the present disclosure can be understood according to specific situations.

The term "and/or" used herein is only for describing an association relationship between the associated objects, which means that there may be three relationships, for example, A and/or B may denote three situations: A exists alone, both A and B exist, and B exists alone.

Furthermore, the expression "at least one" used herein implies any one of a plurality of elements or any combination of at least two of a plurality of elements. For example, including at least one of A, B, and C can imply that any one element or more than one element selected from a group consisting of A, B, and C is (are) included.

Figure 1:
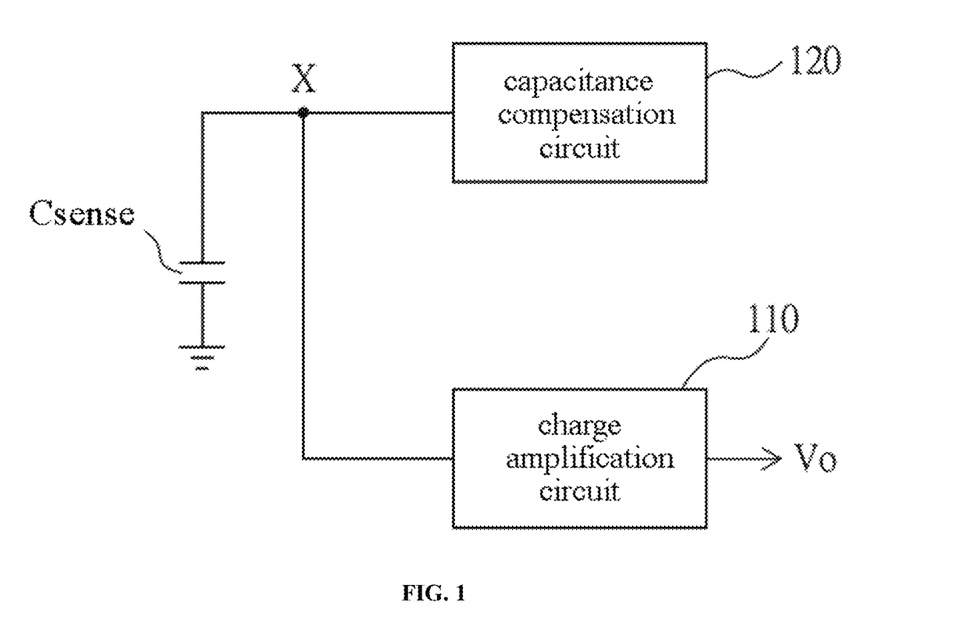
FIG. 1 shows a schematic diagram of a touch detection device according to an embodiment of the present disclosure.

Reference is made to FIG. 1 which shows a schematic diagram of a touch detection device according to an embodiment of the present disclosure.

As shown in FIG. 1, the device comprises:
  a charge amplification circuit 110 connected to a sensing point X of a touch panel and configured to receive an excitation signal VSTIM and charges of the sensing point X, amplify the charges of the sensing point X, and output a capacitance change signal Vo of the sensing point X; and
  a capacitance compensation circuit 120 connected to the sensing point X of the touch panel and configured to inject compensation charges into the sensing point X in a process during which a level of the excitation signal VSTIM changes, wherein a polarity of the compensation charges is related to a direction of the level of the excitation signal VSTIM changing.

According to the embodiment of the present disclosure, the charge amplification circuit 110 receives the excitation signal VSTIM and the charges of the sensing point X, amplifies the charges of the sensing point X, and outputs the capacitance change signal Vo of the sensing point X; and the capacitance compensation circuit 120 injects the compensation charges into the sensing point X in a process during which a level of the excitation signal VSTIM changes, and the polarity of the compensation charges is set to be related to a direction of the level of the excitation signal VSTIM changing, so that the influence caused by the parasitic capacitance of the touch panel can be compensated for or even eliminated, the accuracy of touch detection is improved, and the circuit area is saved.

The embodiment of the present disclosure does not impose restriction on the specific implementation of the charge amplification circuit 110 and the capacitance compensation circuit 120, and those skilled in the art may adopt suitable technical solutions to implement them based on the actual situation and the actual needs, as long as the charge amplification circuit 110 is capable of receiving the excitation signal VSTIM and the charges of the sensing point X, amplifying the charges of the sensing point X, and outputting the capacitance change signal Vo of the sensing point X, and the capacitance compensation circuit 120 is capable of injecting the compensation charges into the sensing point X in a process during which a level of the excitation signal VSTIM changes.

The embodiment of the present disclosure does not impose restriction on the type of the touch panel. By way of example, the touch panel may be a self-capacitance touch panel, and accordingly, the sensing point X may be an end of equivalent capacitance Csense corresponding to the self-capacitance unit of the touch panel, wherein the self-capacitance unit may include at least one self-capacitance.

The embodiment of the present disclosure does not impose restriction on the form of the excitation signal VSTIM, and those skilled in the art may make a choice based on the actual situation and the actual needs. For example, the excitation signal VSTIM may be a periodic square wave-like signal (such as a trapezoidal wave) and the like that change between a high level and a low level.

In one possible implementation, if the excitation signal VSTIM changes from a low level to a high level, the polarity of the compensation charges is positive, or if the excitation signal VSTIM changes from a high level to a low level, the polarity of the compensation charges is negative. In this way, if the excitation signal VSTIM changes from a low level to a high level, positive charges may be injected into the sensing point X in the embodiment of the present disclosure, and if the excitation signal VSTIM changes from a high level to a low level, negative charges may be injected into the sensing point X in the embodiment of the present disclosure, thereby reducing or even eliminating the influence of parasitic capacitance and improving the accuracy of touch detection. Of course, if the excitation signal VSTIM changes from a high level to a low level, the embodiment of the present disclosure may be regarded as involving charge transfer of the positive charges of the sensing point X so as to transfer the positive charges of the sensing point X to the charge compensation circuit, thereby reducing or even eliminating the influence of parasitic capacitance.

In one possible implementation, the capacitance compensation circuit 120 may be configured to:
  when the excitation signal VSTIM changes from a first level to a second level, initialize a voltage of the sensing point X to the first level and gradually inject positive charges into the sensing point X, the second level being higher than the first level; or
  when the excitation signal VSTIM changes from the second level to the first level, initialize the voltage of the sensing point X to the second level and gradually inject negative charges into the sensing point X.

For example, the first level is a low level (0) and the second level is a high level (1), and when the excitation signal VSTIM rises from the low level to the high level, the voltage of the sensing point X is initialized to the low level first, and then positive charges are gradually injected into the sensing point X for charge compensation according to the embodiment of the present disclosure; and when the excitation signal VSTIM drops from the high level to the low level, the voltage of the sensing point X is initialized to the second level first, and then negative charges are gradually injected into the sensing point X for charge compensation according to the embodiment of the present disclosure. In this way, the influence caused by the parasitic capacitance of the touch panel can be compensated for or even eliminated, the accuracy of touch detection can be improved, and the circuit area can be saved according to the embodiment of the present disclosure.

The embodiment of the present disclosure certainly does not impose restriction on the specific mode of "initializing the voltage of the sensing point X to the first level and gradually injecting positive charges into the sensing point X" and "initializing the voltage of the sensing point X to the second level and gradually injecting negative charges into the sensing point X", that is, those skilled in the art may select an appropriate mode based on the actual situation and the actual needs to carry out the above. The following is an exemplary introduction to possible implementations.

Figure 2:
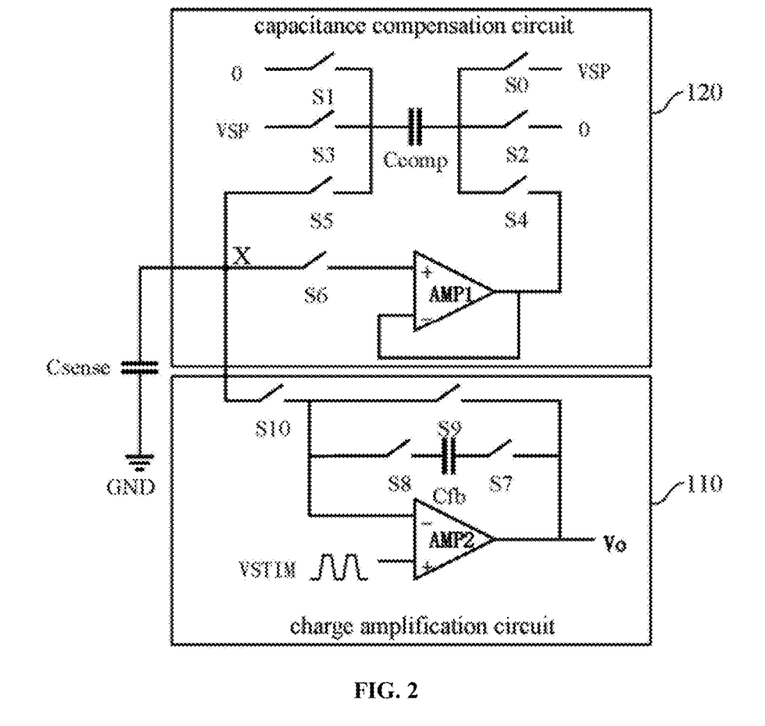
FIG. 2 shows a schematic diagram of a touch detection device according to an embodiment of the present disclosure.

Reference is made to FIG. 2 which shows a schematic diagram of a touch detection device according to an embodiment of the present disclosure.

In one possible implementation, as shown in FIG. 2, the capacitance compensation circuit 120 may comprise a zeroth switch S0, a first switch S1, a second switch S2, a third switch S3, a fourth switch S4, a fifth switch S5, a sixth switch S6, a compensation capacitor Ccomp, and a first operational amplifier AMP1, wherein a first end of the zeroth switch S0, a first end of the second switch S2, and a first end of the fourth switch S4 are all connected to a first end of the compensation capacitor Ccomp, and a first end of the first switch S1, a first end of the third switch S3, and a first end of the fifth switch S5 are all connected to a second end of the compensation capacitor Ccomp;

a second end of the first switch S1 and a second end of the second switch S2 are grounded, and a second end of the zeroth switch S0 and a second end of the third switch S3 are connected to a power supply voltage VSP, a second end of the fifth switch S5 is connected to the sensing point X and a first end of the sixth switch S6, and a positive input terminal of the first operational amplifier AMP1 is connected to a second end of the sixth switch S6, and a negative input terminal of the first operational amplifier AMP1, an output terminal of the first operational amplifier AMP1, and a second end of the fourth switch S4 are connected with one another.

In one possible implementation, as shown in FIG. 2, the charge amplification circuit 110 may comprise a seventh switch S7, an eighth switch S8, a ninth switch S9, a tenth switch S10, an integrating capacitor Cfb, and a second operational amplifier AMP2, wherein a first end of the tenth switch S10 is connected to the sensing point X, and a second end of the tenth switch S10 is connected to a first end of the eighth switch S8, a first end of the ninth switch S9, and a negative input terminal of the second operational amplifier AMP2, a second end of the eighth switch S8 is connected to a first end of the integrating capacitor Cfb, and a first end of the seventh switch S7 is connected to a second end of the integrating capacitor Cfb, a positive input terminal of the second operational amplifier AMP2 is configured to receive the excitation signal VSTIM, and an output terminal of the second operational amplifier AMP2 is connected to a second end of the seventh switch S7 and a second end of the ninth switch S9 for outputting the capacitance change signal Vo.

In one possible implementation, as shown in FIG. 2, in a first time period of a process during which the excitation signal VSTIM changes from a first level (low level 0) to a second level (high level 1), the tenth switch S10 and the ninth switch S9 are turned on; the voltage of the sensing point X is initialized to the first level; the second switch S2, the third switch S3, and the sixth switch S6 are turned on; and the zeroth switch S0, the first switch S1, the fourth switch S4, the fifth switch S5, the seventh switch S7, and the eighth switch S8 are turned off, the second level being higher than the first level; and in a second time period of the process during which the excitation signal VSTIM changes from the first level to the second level, the seventh switch S7 and the eighth switch S8 are turned on; the ninth switch S9 is turned off; and the second switch S2, the third switch S3, the fourth switch S4, and the fifth switch S5 are cyclically switched on and off based on a first switching mode and a second switching mode, wherein in the first switching mode, the second switch S2 and the third switch S3 are turned off, and the fourth switch S4 and the fifth switch S5 are turned on; and in the second switching mode, the second switch S2 and the third switch S3 are turned on, and the fourth switch S4 and the fifth switch S5 are turned off.

By way of example, in the first switching mode, the second switch S2 and the third switch S3 are turned off, and the fourth switch S4 and the fifth switch S5 are turned on, thereby providing positive charges to the sensing point X through the second end of the compensation capacitor Ccomp.

By way of example, in the second switching mode, the second switch S2 and the third switch S3 are turned on, and the fourth switch S4 and the fifth switch S5 are turned off, so that the second end of the compensation capacitor Ccomp is charged by the power supply voltage VSP, in which case the second end of the compensation capacitor Ccomp with positive charges and the first end of the compensation capacitor Ccomp with negative charges.

The embodiment of the present disclosure does not impose restriction on the number of cycles of the first switching mode and the second switching mode in the second time period of the process during which the excitation signal VSTIM changes from the first level to the second level, that is, those skilled in the art may make a determination of the above number based on the actual situation and the actual needs. It is appreciated that the more the number of cycles, the greater the amount of the compensation charges.

By cycling the first switching mode and the second switching mode, charge transfer may be cyclically performed to inject the positive charges on the compensation capacitor Ccomp into the sensing point X to compensate for the influence caused by the parasitic capacitance, thereby improving the accuracy of the touch signal.

In one possible implementation, as shown in FIG. 2, in the first time period of a process during which the excitation signal VSTIM changes from the second level to the first level, the tenth switch S10 and the ninth switch S9 are turned on; the voltage of the sensing point X is initialized to the second level; the zeroth switch S0, the first switch S1, and the sixth switch S6 are turned on; and the second switch S2, the third switch S3, the fourth switch S4, the fifth switch S5, the seventh switch S7, and the eighth switch S8 are turned off, the second level being higher than the first level;

in the second time period of the process during which the excitation signal VSTIM changes from the second level to the first level, the seventh switch S7 and the eighth switch S8 are turned on; the ninth switch S9 is turned off; and the zeroth switch S0, the first switch S1, the fourth switch S4, and the fifth switch S5 are cyclically switched on and off based on a third switching mode and a fourth switching mode, wherein in the third switching mode, the zeroth switch S0 and the first switch S1 are turned off, and the fourth switch S4 and the fifth switch S5 are turned on; and in the fourth switching mode, the zeroth switch S0 and the first switch S1 are turned on, and the fourth switch S4 and the fifth switch S5 are turned off.

By way of example, in the third switching mode, the zeroth switch S0 and the first switch S1 are turned off, and the fourth switch S4 and the fifth switch S5 are turned on, thereby providing negative charges to the sensing point X through the second end of the compensation capacitor Ccomp, that is, transferring the positive charges of the sensing point X to the second end of the compensation capacitor Ccomp.

By way of example, in the fourth switching mode, the zeroth switch S0 and the first switch S1 are turned on, and the fourth switch S4 and the fifth switch S5 are turned off, so that the first end of the compensation capacitor Ccomp is charged by the power supply voltage VSP, in which case the second end of the compensation capacitor Ccomp with negative charges and the first end of the compensation capacitor Ccomp with positive charges.

The embodiment of the present disclosure does not impose restriction on the number of cycles of the third switching mode and the fourth switching mode in the second time period of the process during which the excitation signal VSTIM changes from the second level to the first level, that is, those skilled in the art may make a determination of the above number based on the actual situation and the actual needs. It is appreciated that the more the number of cycles, the greater the amount of the compensation charges.

By cycling the third switching mode and the fourth switching mode, charge transfer may be cyclically performed to inject the negative charges on the compensation capacitor Ccomp into the sensing point X (that is, to transfer the positive charges of the sensing point X to the second end of the compensation capacitor Ccomp) to compensate for the influence caused by the parasitic capacitance, thereby improving the accuracy of the touch signal.

According to the embodiment of the present disclosure, in the cyclical change process of the excitation signal VSTIM, charges are injected into the sensing point X through a compensation capacitor Ccomp to compensate for the influence caused by the parasitic capacitance of the sensing point X, thereby improving the accuracy of touch detection. Moreover, according to the embodiment of the present disclosure, at least only one compensation capacitor Ccomp is needed to effect full-cycle capacitance compensation. Compared with the technical solution of using a complex compensation capacitor Ccomp adopted by the related technology, the embodiment of the present disclosure may significantly reduce the complexity of the circuit, reduce the occupied area of the circuit, and save the cost.

According to the embodiment of the present application, the capacitance change signal Vo is output through the charge amplification circuit 110, so that subsequent modules may determine whether a touch occurs. For example, the embodiment of the present application may further include a touch determination component that receives the capacitance change signal Vo and determines whether a touch occurs based on the capacitance change signal Vo. For example, the touch determination component may determine whether a touch occurs based on the capacitance change signal Vo during the rise of the excitation signal VSTIM from a low level to a high level, or determine whether a touch occurs based on the capacitance change signal Vo during the fall of the excitation signal VSTIM from a high level to a low level, or determine whether a touch occurs based on a signal of difference between a first output voltage signal and a second output voltage signal, wherein the first output voltage signal is the capacitance change signal Vo in the process during which the excitation signal VSTIM rise from the low level to the high level, and the second output voltage signal is the capacitance change signal Vo in the process during which the excitation signal VSTIM fall from the high level to the low level. The embodiment of the present disclosure does not impose restriction on the specific mode of determining whether a touch occurs, that is, those skilled in the art may adopt appropriate technical solutions to carry out the above determination based on the actual situation and the actual needs.

Figure 3:
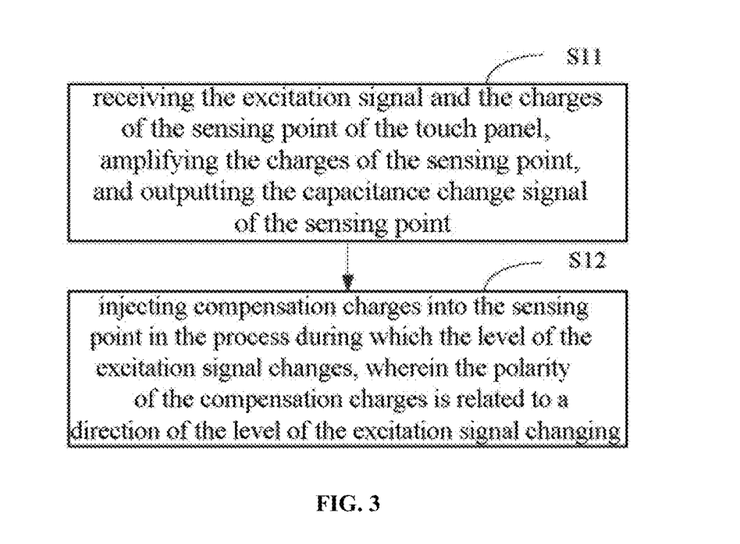
FIG. 3 shows a flowchart of a touch detection method according to an embodiment of the present disclosure.

Reference is made to FIG. 3 which shows a flowchart of a touch detection method according to an embodiment of the present disclosure.

As shown in FIG. 3, the method comprises:
a step S11 of receiving the excitation signal VSTIM and the charges of the sensing point X of the touch panel, amplifying the charges of the sensing point X, and outputting the capacitance change signal Vo of the sensing point X; and
a step S12 of injecting compensation charges into the sensing point X in process during which the level of the excitation signal VSTIM changes, wherein the polarity of the compensation charges is related to a direction of the level of the excitation signal VSTIM changing.

According to the embodiment of the present application, by receiving the excitation signal VSTIM and the charges of the sensing point X, amplifying the charges of the sensing point X, outputting the capacitance change signal Vo of the sensing point X, injecting the compensation charges into the sensing point X in the process during which the level of the excitation signal VSTIM change, and setting the polarity of the compensation charges to be related to a direction of the level of the excitation signal VSTIM changing, the influence caused by the parasitic capacitance of the touch panel can be compensated for or even eliminated, the accuracy of touch detection is improved, and the circuit area is saved.

In one possible implementation, the method may comprise:
the polarity of the compensation charges being positive if the excitation signal VSTIM changes from a low level to a high level, or negative if the excitation signal VSTIM changes from a high level to a low level.

In one possible implementation, the method may comprise: when the excitation signal VSTIM changes from a first level to a second level, initializing a voltage of the sensing point X to the first level, and gradually injecting positive charges into the sensing point X, the second level being higher than the first level; or when the excitation signal VSTIM changes from the second level to the first level, initializing the voltage of the sensing point X to the second level, and gradually injecting negative charges into the sensing point X.

The touch detection method according to the embodiment of the present disclosure may be implemented by a processing component. In one example, the processing component includes but is not limited to an individual processor, or a discrete component, or a combination of a processor and a discrete component. The processor may comprise a controller having the function of executing instructions in an electronic apparatus, and may be implemented in any suitable way, for example, by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements. Within the processor, the executable instructions may be executed by hardware circuits such as logic gates, switches, application specific integrated circuits (ASICs), programmable logic controllers, and embedded microcontrollers.

It should be noted that the touch detection method is a method corresponding to the touch detection device. Therefore, reference could be made to the previous description of the device for the specific introduction to the touch detection method, which will not be repeated here.

According to one aspect of the present disclosure, there is provided a chip, comprising the above touch detection device.

According to one aspect of the present disclosure, there is provided a display apparatus, comprising a plurality of display units and the above chip.

In one possible implementation, the display unit comprises a display panel, wherein the display panel includes at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, and a small pitch display panel.

According to one aspect of the present disclosure, there is provided an electronic apparatus, comprising the above display apparatus.

By way of example, the electronic apparatus in the embodiment includes, but is not limited to, a desktop computer, a television, a mobile device with a large-size screen such as a mobile phone and a tablet computer, and other common electronic apparatuses that require multiple chips to be connected in cascade to effect the drive.

By way of example, the electronic apparatus may also be a User Equipment (UE), a mobile device, a user terminal, a terminal, a handheld device, a computing device, or a vehicle-mounted device. By way of example, some examples of terminals include a monitor, a smartphone or portable device, a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgeries, a wireless terminal in smart grid, a wireless terminal in transportation safety, a wireless terminal in smart city, a wireless terminal in smart home, a wireless terminal in Telematics, and the like. For example, the server may be a local server or a cloud server.

Figure 4:
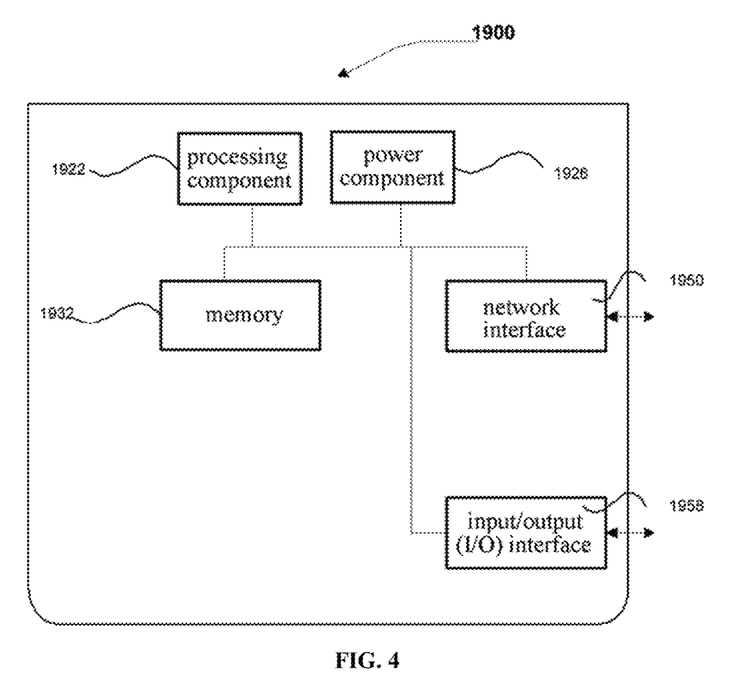
FIG. 4 shows a block diagram of an electronic apparatus according to an embodiment of the present disclosure.

Reference is made to FIG. 4 which shows a block diagram of an electronic apparatus according to an embodiment of the present disclosure.

For example, an electronic apparatus 1900 may be provided as a server or a terminal device. Referring to FIG. 4, the electronic apparatus 1900 comprises a processing component 1922, which further comprises one or more processors, and a memory resource represented by a memory 1932 for storing instructions executable by the processing component 1922, such as application programs. The application program stored in the memory 1932 may include one or more modules each corresponding to a set of instructions. In addition, the processing component 1922 is configured to execute instructions to execute the above method.

The electronic apparatus 1900 may further comprise a power component 1926 configured to perform power management of the electronic apparatus 1900, a wired or wireless network interface 1950 configured to connect the electronic apparatus 1900 to a network, and an input/output (I/O) interface 1958. The electronic apparatus 1900 can operate based on an operating system stored in the memory 1932, such as Windows Server™, Mac OS X™, Unix™, Linux™, FreeBSD™ or the like.

In an exemplary embodiment, there is further provided a non-transitory computer readable storage medium, such as the memory 1932 including computer program instructions, which can be executed by the processing component 1922 of the electronic apparatus 1900 to implement the above method.

The above-mentioned are only exemplary embodiments of the present disclosure, and are not intended to limit the scope of protection of the present disclosure which is determined by the appended claims.

The word "exemplary" used here means "serving as an example, embodiment or illustration". Any embodiment described here as "exemplary" is not necessarily to be interpreted as superior to or better than other embodiments.

It is appreciated that the words "include", "comprise" or any other variant thereof, as used herein, are intended to encompass non-exclusive inclusion, such that a process, a method, an article or an apparatus comprising a set of elements includes not only those elements, but also other elements that are not expressly listed, or elements that are inherent to such process, method, article or apparatus. Without further limitation, the fact that an element is defined by the expression "include/comprise a/one . . . " does not exclude the existence of other identical elements in the process, method, article or apparatus including the above element.

The flowcharts and block diagrams in the drawings illustrate the architecture, function, and operation that may be implemented by the system, method and computer program product according to the various embodiments of the present disclosure. In this regard, each block in the flowchart or block diagram may represent a module, a program segment, or a part of an instruction, and the module, program segment, or part of an instruction comprises one or more executable instructions for implementing the specified logical function(s). In some alternative implementations, the functions denoted in the blocks may occur in an order different from that denoted in the drawings. For example, two consecutive blocks may, in fact, be executed substantially in parallel, or sometimes they may be executed in a reverse order, depending upon the functions involved. It should also be noted that each block in the block diagram and/or flowchart, and combinations of blocks in the block diagram and/or flowchart, can be implemented by dedicated hardware-based systems performing the specified functions or actions, or by combinations of dedicated hardware and computer instructions.

Although the embodiments of the present disclosure have been described above, it will be appreciated that the above descriptions are merely exemplary but not exhaustive, and that the disclosed embodiments are not limiting. A number of variations and modifications, without departing from the scopes and spirits of the described embodiments, are apparent to those skilled in the art. The terms selected in the present disclosure are intend to best explain the principles of the embodiments, practical applications or the technical improvements to the arts in the market, or to make the embodiments described herein understandable to those skilled in the art.

What is claimed is:

1. A touch detection device, comprising:
   a charge amplification circuit connected to a sensing point of a touch panel and configured to receive an excitation signal and charges of the sensing point, amplify the charges of the sensing point, and output a capacitance change signal of the sensing point; and
   a capacitance compensation circuit connected to the sensing point of the touch panel and configured to inject compensation charges into the sensing point in a process during which a level of the excitation signal changes, wherein a polarity of the compensation charges is related to a direction of the level of the excitation signal changing.

2. The device according to claim 1, wherein the polarity of the compensation charges is positive in response to the excitation signal changing from a low level to a high level, or the polarity of the compensation charges is negative in response to the excitation signal changing from a high level to a low level.

3. The device according to claim 1, wherein the capacitance compensation circuit is further configured to:
   in response to the excitation signal changing from a first level to a second level, initialize a voltage of the sensing point to the first level, and gradually inject positive charges into the sensing point, the second level being higher than the first level; or
   in response to the excitation signal changing from the second level to the first level, initialize the voltage of the sensing point to the second level, and gradually inject negative charges into the sensing point.

4. The device according to claim 1, wherein the capacitance compensation circuit comprises a zeroth switch, a first switch, a second switch, a third switch, a fourth switch, a fifth switch, a sixth switch, a compensation capacitor, and a first operational amplifier, wherein
   a first end of the zeroth switch, a first end of the second switch, and a first end of the fourth switch are all connected to a first end of the compensation capacitor, and a first end of the first switch, a first end of the third switch, and a first end of the fifth switch are all connected to a second end of the compensation capacitor;
   a second end of the first switch and a second end of the second switch are grounded, and a second end of the zeroth switch and a second end of the third switch are connected to a power supply voltage,
   a second end of the fifth switch is connected to the sensing point and a first end of the sixth switch, and
   a positive input terminal of the first operational amplifier is connected to a second end of the sixth switch, and a negative input terminal of the first operational amplifier, an output terminal of the first operational amplifier, and a second end of the fourth switch are connected with one another.

5. The device according to claim 4, wherein the charge amplification circuit comprises a seventh switch, an eighth switch, a ninth switch, a tenth switch, an integrating capacitor, and a second operational amplifier, wherein
   a first end of the tenth switch is connected to the sensing point, and a second end of the tenth switch is connected to a first end of the eighth switch, a first end of the ninth switch, and a negative input terminal of the second operational amplifier,
   a second end of the eighth switch is connected to a first end of the integrating capacitor, and a first end of the seventh switch is connected to a second end of the integrating capacitor,
   a positive input terminal of the second operational amplifier is configured to receive the excitation signal, and
   an output terminal of the second operational amplifier is connected to a second end of the seventh switch and a second end of the ninth switch for outputting the capacitance change signal.

6. The device according to claim 5, wherein
   in a first time period of a process during which the excitation signal changes from a first level to a second level, the tenth switch and the ninth switch are turned on; a voltage of the sensing point is initialized to the first level; the second switch, the third switch, and the sixth switch are turned on; and the zeroth switch, the first switch, the fourth switch, the fifth switch, the seventh switch, and the eighth switch are turned off, the second level being higher than the first level; and
   in a second time period of the process during which the excitation signal changes from the first level to the second level, the seventh switch and the eighth switch are turned on; the ninth switch is turned off; and the second switch, the third switch, the fourth switch, and the fifth switch are cyclically switched on and off based on a first switching mode and a second switching mode, wherein
      in the first switching mode, the second switch and the third switch are turned off, and the fourth switch and the fifth switch are turned on; and
      in the second switching mode, the second switch and the third switch are turned on, and the fourth switch and the fifth switch are turned off.

7. The device according to claim 5, wherein
   in a first time period of a process during which the excitation signal changes from a second level to a first level, the tenth switch and the ninth switch are turned on; a voltage of the sensing point is initialized to the second level; the zeroth switch, the first switch, and the sixth switch are turned on; and the second switch, the third switch, the fourth switch, the fifth switch, the seventh switch, and the eighth switch are turned off, the second level being higher than the first level; and
   in a second time period of the process during which the excitation signal changes from the second level to the first level, the seventh switch and the eighth switch are turned on; the ninth switch is turned off; and the zeroth switch, the first switch, the fourth switch, and the fifth switch are cyclically switched on and off based on a third switching mode and a fourth switching mode, wherein
in the third switching mode, the zeroth switch and the first switch are turned off, and the fourth switch and the fifth switch are turned on; and
in the fourth switching mode, the zeroth switch and the first switch are turned on, and the fourth switch and the fifth switch are turned off.

8. A touch detection method, comprising:
receiving an excitation signal and charges of a sensing point of a touch panel, amplifying the charges of the sensing point, and outputting a capacitance change signal of the sensing point; and
injecting compensation charges into the sensing point in a process during which a level of the excitation signal changes, wherein a polarity of the compensation charges is related to a direction of the level of the excitation signal changing.

9. The method according to claim 8, further comprising:
the polarity of the compensation charges being positive in response to the excitation signal changing from a low level to a high level, or the polarity of the compensation charges being negative in response to the excitation signal changing from a high level to a low level.

10. The method according to claim 8, wherein injecting the compensation charges into the sensing point comprises:
in response to the excitation signal changing from a first level to a second level, initializing a voltage of the sensing point to the first level, and gradually injecting positive charges into the sensing point, the second level being higher than the first level; or
in response to the excitation signal changing from the second level to the first level, initializing the voltage of the sensing point to the second level, and gradually injecting negative charges into the sensing point.

11. An electronic apparatus, comprising a display apparatus, which comprises a plurality of display units and a chip comprising a touch detection device, the touch detection device comprising:
a charge amplification circuit connected to a sensing point of a touch panel and configured to receive an excitation signal and charges of the sensing point, amplify the charges of the sensing point, and output a capacitance change signal of the sensing point; and
a capacitance compensation circuit connected to the sensing point of the touch panel and configured to inject compensation charges into the sensing point in a process during which a level of the excitation signal changes, wherein a polarity of the compensation charges is related to a direction of the level of the excitation signal changing.

12. The electronic apparatus according to claim 11, wherein the display unit comprises a display panel, wherein the display panel comprises at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, or a small pitch display panel.

* * * * *